March 14, 1939.  R. J. BURROWS ET AL  2,150,150

SELECTIVE DRIVE MECHANISM

Filed Jan. 11, 1936  7 Sheets-Sheet 1

Inventors:
Robert J. Burrows,
Robert Lapsley,
Alfred O. Williams.
By
Attys.

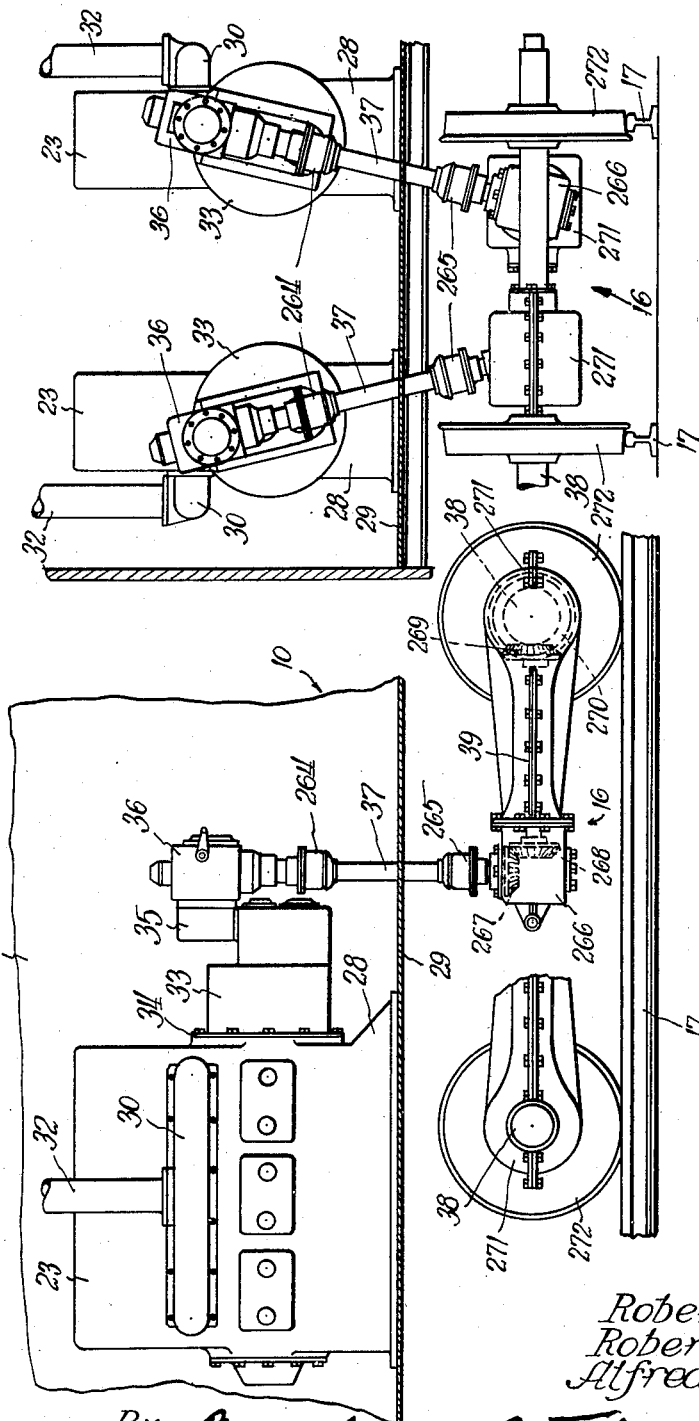

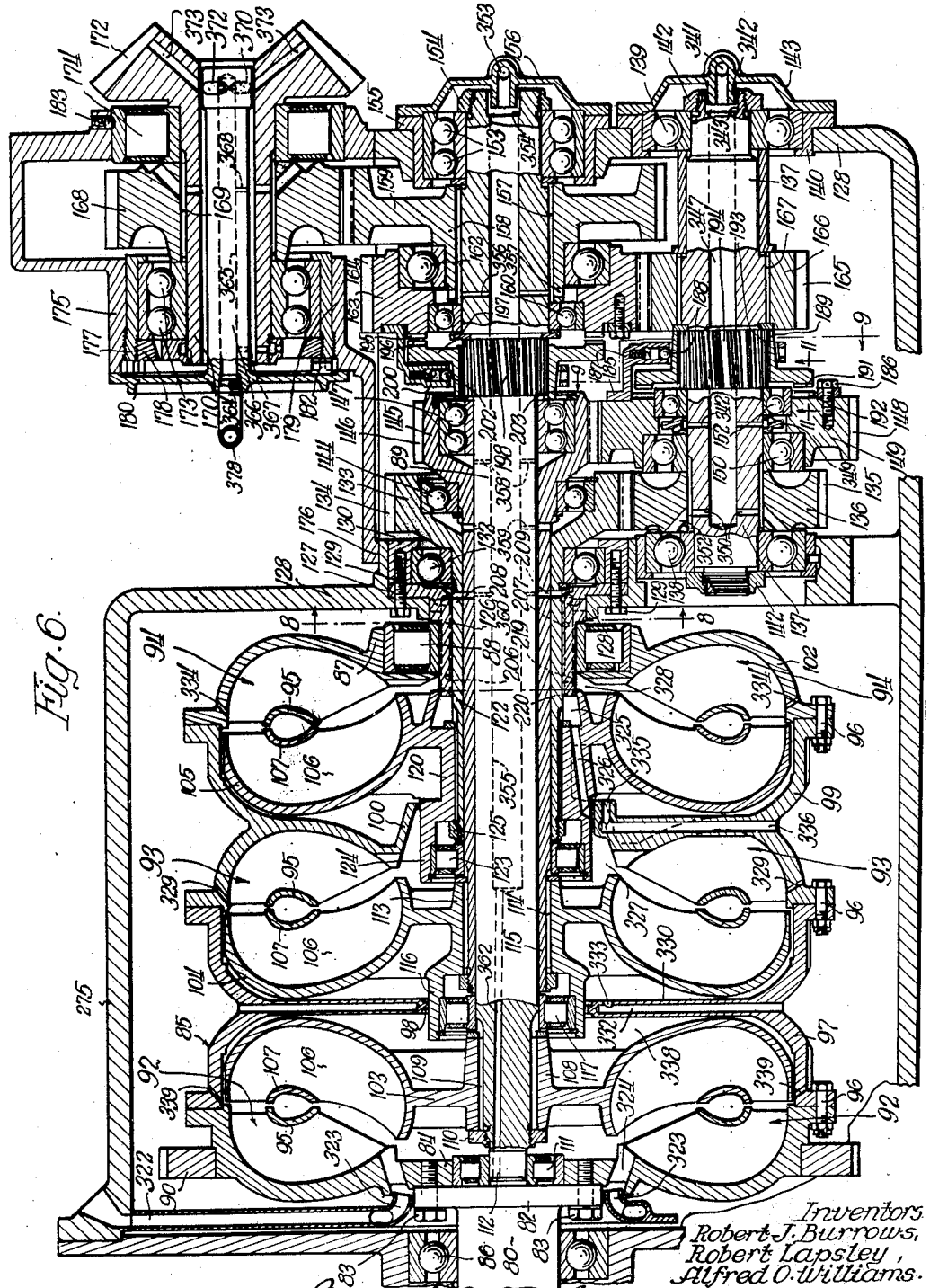

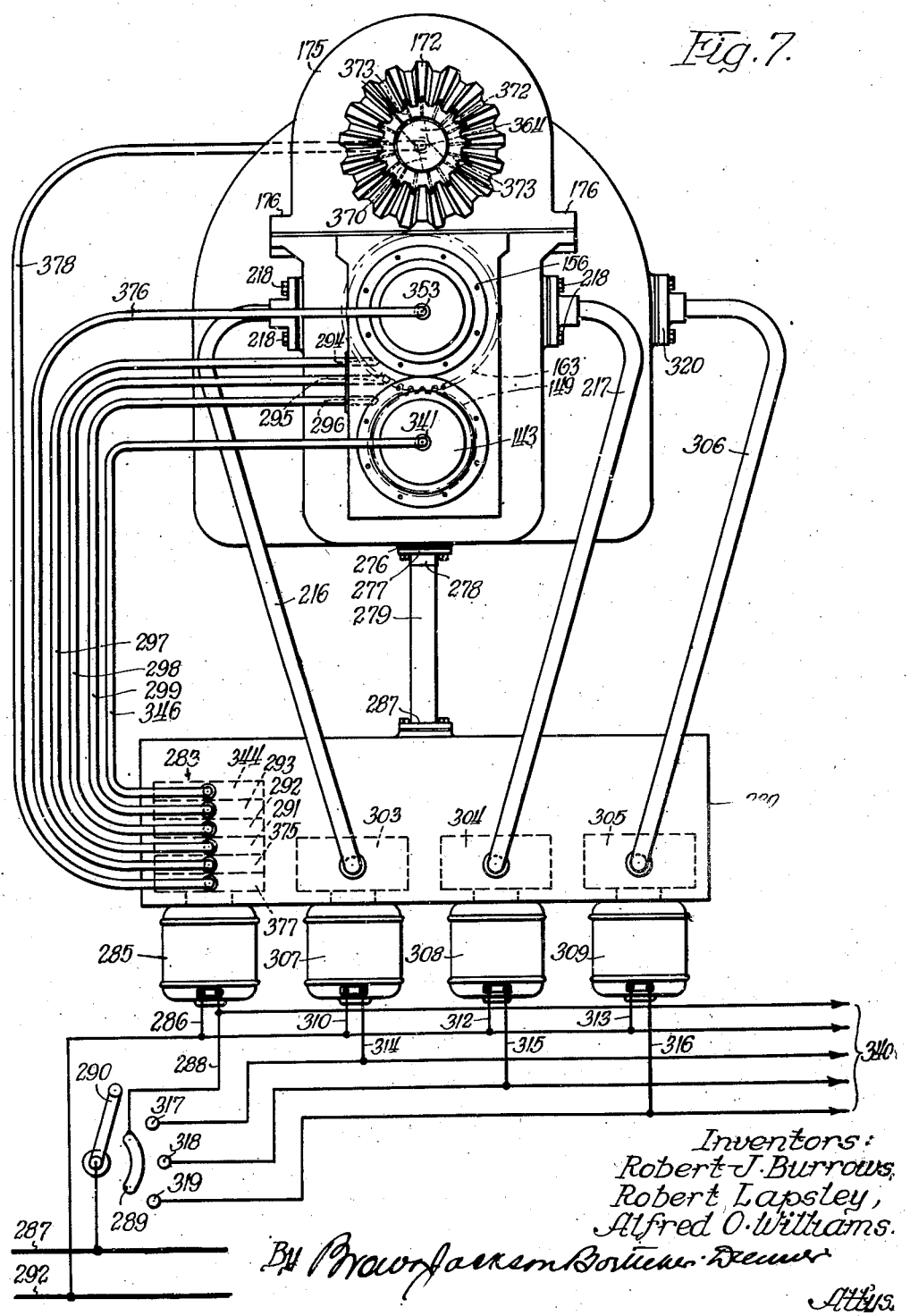

March 14, 1939.  R. J. BURROWS ET AL  2,150,150
SELECTIVE DRIVE MECHANISM
Filed Jan. 11, 1936   7 Sheets-Sheet 6
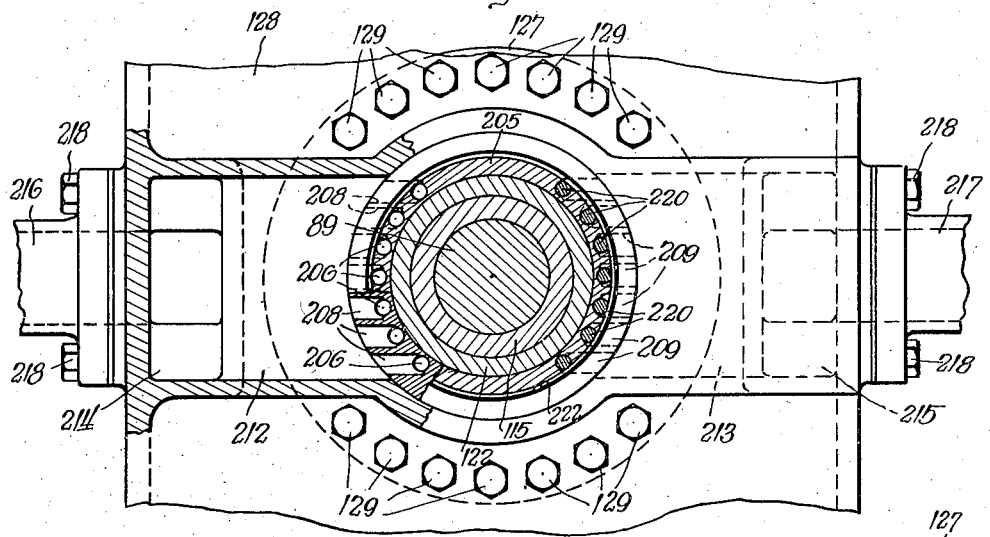
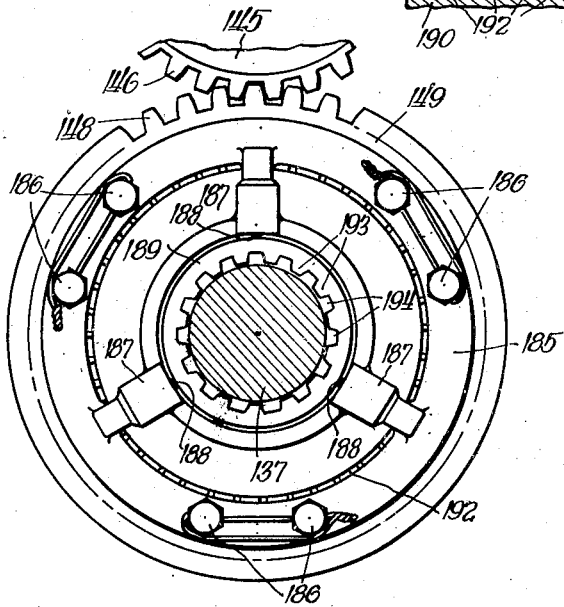
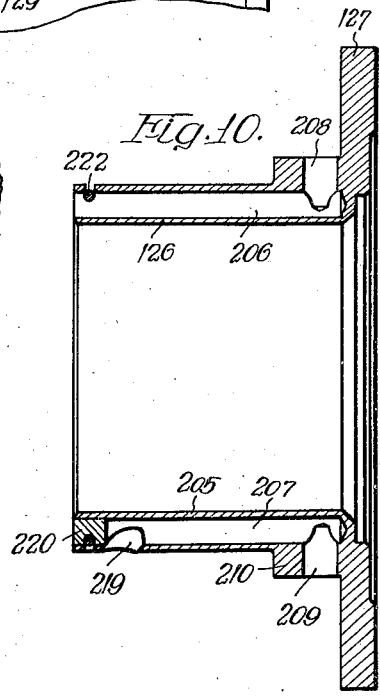
Inventors:
Robert J. Burrows,
Robert Lapsley,
Alfred O. Williams.
By Brown Jackson Boettcher & Dienner
Attys.

March 14, 1939. R. J. BURROWS ET AL 2,150,150
SELECTIVE DRIVE MECHANISM
Filed Jan. 11, 1936 7 Sheets-Sheet 7

Inventors:
Robert J. Burrows,
Robert Lapsley,
Alfred O. Williams.
By Brown Jackson Boettcher Dienner
Attys Patented Mar. 14, 1939

2,150,150

UNITED STATES PATENT OFFICE 2,150,150

SELECTIVE DRIVE MECHANISM

Robert J. Burrows, Battle Creek, Robert Lapsley, Berrien Springs, and Alfred O. Williams, Battle Creek, Mich., assignors, by mesne assignments, to Clark Equipment Company, Buchanan, Mich., a corporation of Michigan Application January 11, 1936, Serial No. 58,712

10 Claims. (Cl. 105—62)

This invention relates to selective drive mechanisms and, more particularly, is directed to the incorporation of such drive mechanisms into the modern type of rail cars, locomotive coaches, power cars for stream-lined high speed trains, and other car or train propelling mechanisms.

Recent developments in light-weight high speed train and rail car design have introduced numerous problems, such as the type of change speed drive transmission to be employed, the manner in which the drive is to be transmitted to the trucks disposed beneath and supporting the car, and the weight location of the power units, in order that self-propelled single cars or propelling cars with sufficient motive power for hauling a relatively large number of coaches or other cars constituting a train can be provided having efficient and positive driving mechanism.

In order to have a power car capable of propelling relatively long trains at the high speed required, we have found it highly desirable to provide a power drive or drive unit for each axle under the power car. This does not appear to be essential in connection with the use of such units for a single car train. By the provision of such an arrangement, we are able to retain the advantages of relatively small mechanical drive units, since such a drive is more practical in that it is easier to install the shaft, gearing and bearings of proper capacity without the addition of an unnecessary amount of weight.

Our work in this connection has led us to certain conclusions, namely, that the prime mover and as much of the transmitting mechanism as possible should be suspended within the car body where it has the advantage of spring suspension rather than being placed upon the trucks and constituting a portion of the unsprung weight of the vehicle. Also, in order to obtain light weight cars with quick and positive acceleration, the power unit and the mechanism for transmitting the drive to the driving axle should be of such design as to give the lightest weight consistent with the necessary strength of the various elements constituting the same. Conventional mechanical drives were investigated, but these were found to be satisfactory and efficient only when used on low-powered engines, presenting insurmountable difficulties when it was attempted to adapt this type of power transmission to high-powered engines. We find that if all the power is generated by a single large engine, two difficulties present themselves—first, division of power from the engine to the four axles for the two driving trucks, and, second, the amount of torque and the loads present in modern high speed train equipment of this type make it difficult to provide gears, bearings and shafts large enough in the limited space available to obtain the desired safety factors.

It has been suggested that the high-powered Diesel or semi-Diesel engine be coupled with generators and electric driving motors whereby the cars or trains derive the axle driving power from electrically driven motors or the like. The resort to this construction has been due in a large measure to the inflexibility of operation of Diesel engines, and the inability to accommodate such engines to change speed gear transmissions or the like, especially where more than one engine unit is employed in the same car or locomotive. However, it has been found that while electrical transmissions have excellent operating characteristics and are reasonably reliable, the heavy weight and low efficiency of the power transmission considerably offset any advantages obtained by their use. A mechanical drive has a much higher overall efficiency than electrical drive and electrical drive equipment. Such drive equipment necessarily includes generators, motors, and other ancillary electrical control mechanism, and is much heavier than the corresponding mechanical drive parts.

Other disadvantages arising from prior types of drive mechanisms of this class with which we are familiar are the increased spacial requirements necessary for the conversion units and their control mechanism, and the increased number of separate rotating parts which must be serviced, inspected and repaired, as well as the initial cost of such equipment.

Our present invention, in its preferred embodiment, is directed to a selective drive mechanism comprising a plurality of separate engine power units for directly driving locomotives, rail cars and the like. In order to provide a drive mechanism capable of adequately meeting the problems presented, it is necessary to provide for synchronized shifting or speed changing mechanism whereby all of the engine units will change their driving ratio at substantially the same time, and will be automatically self-compensating to carry their respective portions of the load.

One of the primary objects of the present invention is to provide a selective drive mechanism comprising change speed gearing in which the gears for the various driving ratios remain constantly in mesh, and hydraulic clutches are employed for shifting from one driving ratio to another. An important advantage secured by such a drive resides in the flexibility of operation which may be provided, since no predetermined sequence of selection of the driving ratios is necessary, and such selection can be made from any one to any other ratio as determined by the operator.

Another object of the present invention is to provide a common control means for simultaneously effecting the selection of the same driving ratio at a plurality of separately operating drive units, this control means being positioned at any convenient or desired location in the vehicle being driven, or even in a separate vehicle coupled to the driving vehicle.

In order to render the driving mechanism more flexible in operation, the present invention provides hydraulic clutches for selectively coupling the various sets of change speed gearing to the driving shaft, irrespective of the speed at which the driving shaft is rotating. Thus the engine units may be brought up to substantially full speed operation prior to the coupling of the driving gear mechanism thereto, and, depending on the torque load and the acceleration which is desired, any predetermined driving ratio may be selected and the load will be smoothly and gradually picked up automatically by the hydraulic clutches, thereby providing for smooth starting and acceleration of the vehicle at any desired rate.

Another object of the present invention is to provide for positioning of the driving units and the seletcive drive mechanism therefor directly over the trucks, whereby the entire power plant is made readily accessible for inspection and service, is spring suspended, and provides for the most efficient load distribution within the car.

In this connection, we provide a novel type of gear construction, including specially designed means for suspending the gearing and its associated power plant uniformly over the truck. This allows for a lighter weight frame construction for the body of the car than would be necessary if a single larger size of engine with an electrical generating plant was placed in the middle of the car.

In the present design, we contemplate the use of four-wheel driving trucks in which the lower portion of the mechanism or driving gear is made a composite part of the driving axle, whereby the necessity of flexible couplings or universal joints between the lower bevel gears of the drive mechanism and the driving axle is eliminated.

Another feature of the present invention is the spring suspension of all of the power plant and drive mechanism up to the driving axle, with means intermediate the transmission and axle for obtaining forward or reverse driving of the axles at any desired speed.

Another feature of the present invention resides in a novel type of control mechanism for effecting synchronized selection of the various driving ratios at all of the drive units, which mechanism is adapted to be extended to any desired number of driving units, all of which may be controlled from a single station or control point.

Another advantage secured by the present invention resides in the provision of a composite driving gear assembly, with the hydraulic clutches operating the same being disposed entirely at one side of the various sets of driving gears, whereby the pressure lines for operating the hydraulic clutches are entirely clear and independent from any of the gear mechanism.

We also provide for adapting a single selective drive mechanism to any desired drive ratio, by employing a set of interchangeable driving gears interposed between the driven shaft of the selective drive mechanism and the drive transmitting shaft leading to the axle.

Another advantage secured by the present invention is the provision of a mechanism for taking care of the change speed requirements at torque multiplications essential in such rail car designs so that the clutching takes place noiselessly and efficiently, giving a transmitting means from the prime mover to the axle that embodies the advantageous operating characteristics and reliability of an electric drive without the attendant disadvantages of complicated control mechanism, low efficiency and heavy weight.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 3 is an elevational sectional view through the car, showing the manner in which the drive is transmitted from a power unit to a driving axle of one of the driving trucks;

Figure 4 is an end elevational view of the structure shown in Figure 3, taken substantially transversely across the car body;

Figure 6 is a detail sectional view through the preferred form of a selective drive mechanism embodied in the present invention;

Figure 7 is an end elevational view of the mechanism shown in Figure 6, together with a diagrammatic circuit embodying the controlling mechanism therefor;

Figure 8 is a sectional view taken substantially on line 8—8 of Figure 6;

Figure 9 is a sectional view through one of the overrunning clutch mechanisms employed in the present invention, taken substantially on line 9—9 of Figure 6;

Figure 10 is a vertical sectional view through the hydraulic coupling member for introducing the liquid under pressure into the hydraulic clutches;

Figure 11 is a sectional view taken on line 11—11 of Figure 6; and

Figure 1:
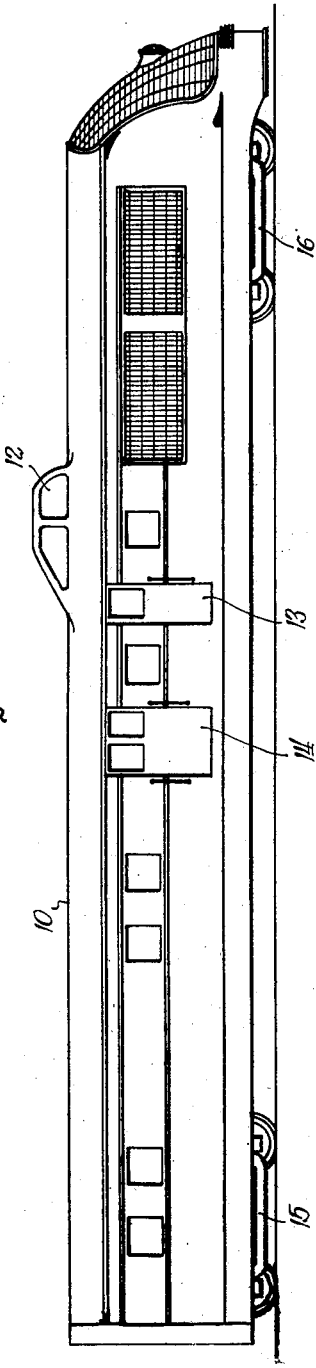
Figure 1 is a side elevational view of a rail car embodying novel features of the present invention.
Figure 2:
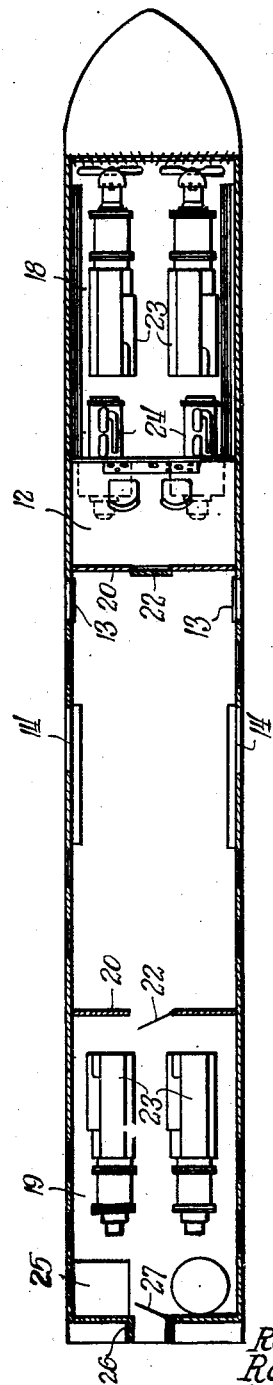
Figure 2 is a horizontal sectional view through the car shown in Figure 1, showing in detail the floor plan construction thereof.

Referring now in more detail to Figures 1 and 2 of the drawings, we have provided a rail car or locomotive coach 10 having a forwardly disposed and elevated operator's compartment or cab 12 provided with oppositely disposed doors 13 at the sides of the car whereby the operator may enter the control cab. The car proper is provided with opposite doors 14 disposed substantially centrally of the longitudinally extending side walls of the car body, which doors provide access to the interior of the remaining portion of the car. The car 10 is mounted, in a manner described in more detail in the copending Burrows and Williams application, Serial No. 57,747, filed January 6, 1936, upon a pair of driving trucks 15 and 16, and provided with the usual flanged and preferably resilient or cushioned car wheels engaging the rails 17 for propelling the car therealong. The trucks preferably comprise parallel side rail members and a transverse spring supported bolster (not shown) for mounting the car body pivotally thereon.

The interior of the car, as shown in more detail in Figure 2, is provided with longitudinally spaced engine compartments 18 and 19 which are separated by lateral partitions 20, provided with doors 22 whereby entrance into the engine compartment from the intermediate portion of the car body is provided. Each of the engine compartments is adapted to contain a plurality of power units 23, which, in one preferred form of the invention, comprise Diesel engines capable of developing approximately 400 H. P. each. It will be noted that the engine units 23 are disposed substantially directly over the driving trucks 15 and 16, whereby the major portion of the weight of the car is carried directly over the trucks, thereby reducing the weight of the intermediate frame portion of the car, since it is not required to support this weight. This results in the provision of a relatively light weight power car.

In the forward engine compartment there is also provided a pair of relatively small auxiliary power units 24, preferably utilized to develop electric current for lighting, air compressors, and for the operation of ventilating and air conditioning equipment. Such equipment is shown diagrammatically at 25, and may comprise heating and ventilating means for a car of this type and disclosed generally in the copending Burrows and Williams application, Serial No. 666,076, filed April 14, 193. The rear end of the car is provided with the wall or partition 26 having a door 27 providing for passage outwardly therethrough. If the car 10 is to form part of an articulated train construction, the partition 26 will cooperate with a similar partition carried by the second car whereby effective coupling of the two cars for pivotal movement about a centerpoint substantially midway of the door openings of the partition is provided.

Considering now in more detail the power unit and driving connections shown in Figures 3 and 4, the manner in which the power unit is mounted with respect to the car body is believed to be apparent from the disclosure. The engine unit 23 is provided with a flanged base portion 28 adapted to be bolted or otherwise suitably secured to the floor 29 of the car body. Suitable exhaust manifolds 30 having vertically extending exhaust pipes 32 connected thereto and leading outwardly through mufflers or the like are provided for each of the units 23. At one end of each of the units 23 there is provided a housing 33 having coupling means 34 providing for coupling engagement between the drive shaft of the engine unit and the transmission unit. If desired, flexible couplings may be connected between the engine unit and the transmission unit. The housings 33 are adapted to contain selective drive mechanisms whereby various driving ratios are provided for transmitting the power of the engine to the driving truck. This mechanism will be described in more detail hereinafter.

Figure 12:
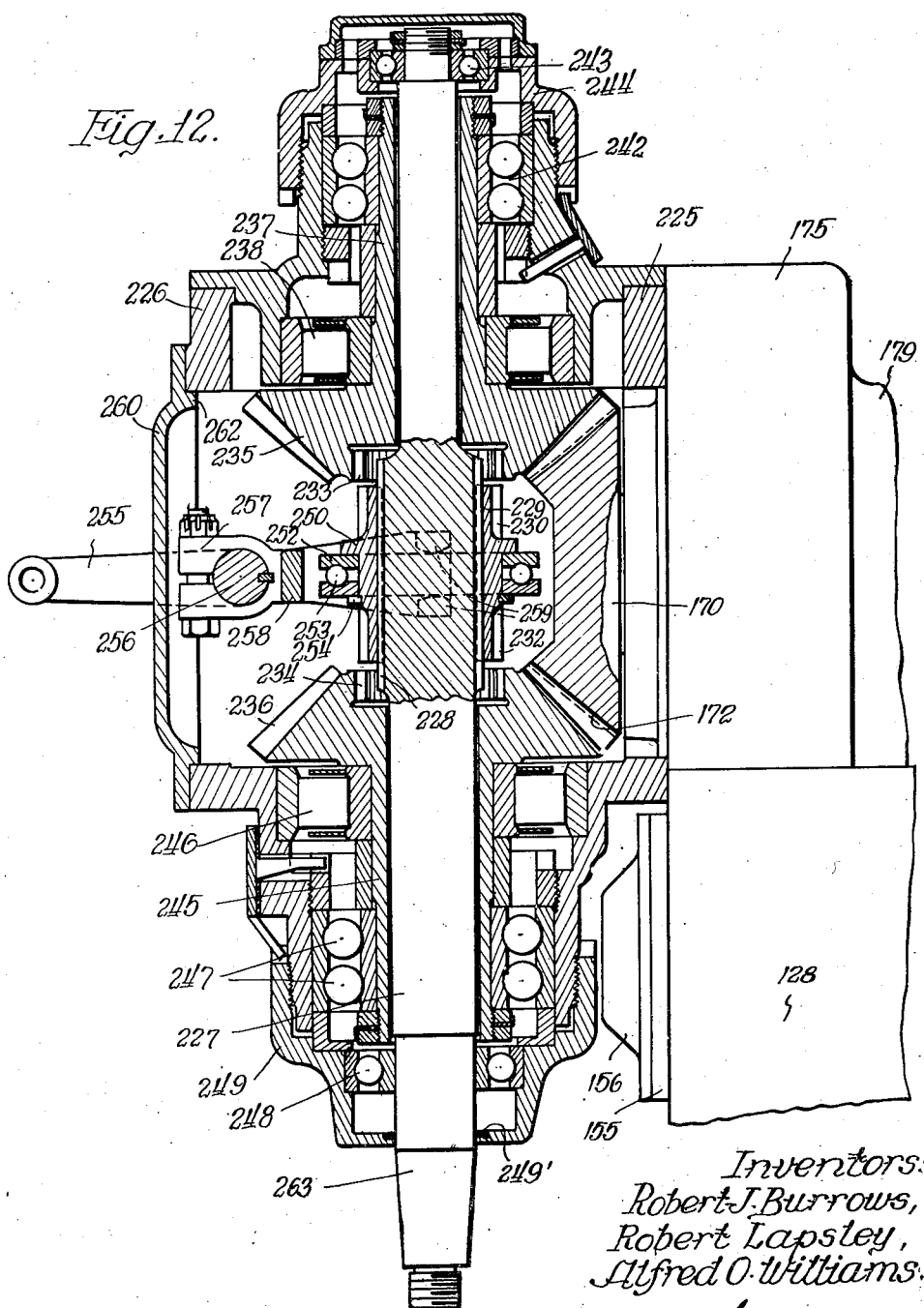
Figure 12 is a vertical sectional view through the reversing mechanism and drive transmitting shaft.

Mounted on each of the extending portions of the housing 33 is an adapter housing 35 containing suitable gearing for transmitting the drive from the transmission units 3 into the gear housing 36 of a vertically and angularly extending drive shaft mechanism, indicated generally at 37, which extends downwardly to a point substantially co-planar with the axles 38 of the driving trucks. At this point the drive is transmitted from the driving means 37 of each unit to respective forwardly and rearwardly extending torque tubes 39, whereby one of the engines in the compartment 18 is adapted to drive the forward axle 38 of the driving truck assembly, while the other engine unit is adapted to drive the rear axle 38 of the driving truck assembly. The detailed construction of the drive transmitting means 37 is shown in Figure 12 and will be described in more detail in connection therewith.

Figure 5:
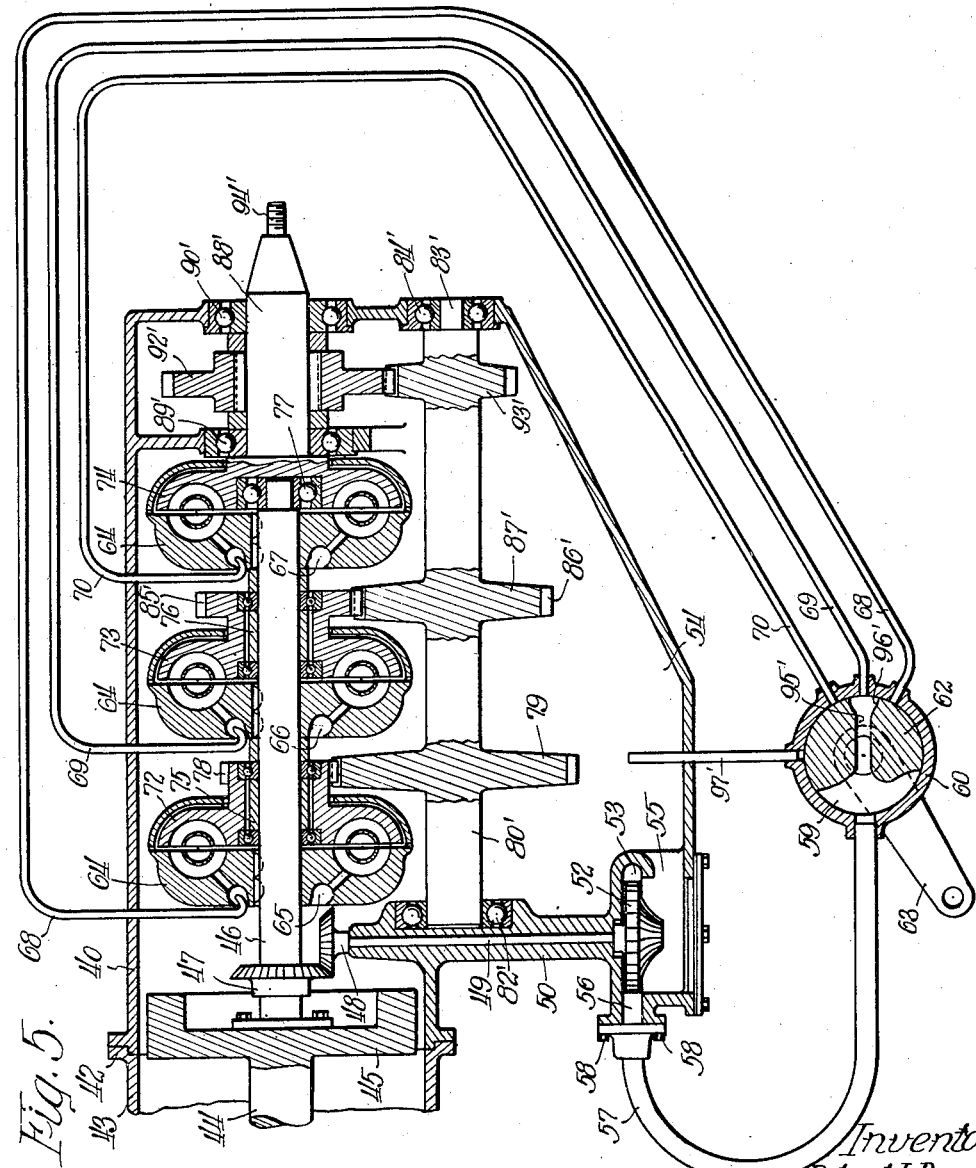
Figure 5 is a sectional view through one embodiment of the selective drive mechanism of the present invention.

Referring now in detail to the diagrammatic showing of one form of the selective drive mechanism which may be employed in the present invention, in Figure 5 we provide a housing 40 which is suitably piloted in the rearwardly evtending portion 42 of the crank-case housing 43 of a power unit. A driving shaft 44 having a flywheel 45 at the end thereof is rigidly connected to the drive shaft 46 of the transmission assembly carried within the housing 40. The shaft 46 is provided with a bevel gear 47, keyed or otherwise non-rotatably secured thereto, which is adapted to have driving engagement with a bevel gear 48 carried on a shaft 49 mounted for rotation in the enlarged wall portion 50 of the housing 40, the shaft extending normal to the axis of the shaft 46.

At its opposite end, the shaft 49 is provided with an impeller 52 mounted for rotation in an impeller chamber 53, preferably formed integrally with the housing 40, although the impeller chamber may be formed separately if so desired. The impeller 52 is provided with a plurality of vanes or blades which are adapted to draw oil from the lower portion 54 of the housing 40 through the opening 55 into the impeller chamber 53, and to force this oil under pressure outwardly through the opening 56 into the pressure conduit 57 which is connected to the outlet 56 by means of a pair of cooperating flanges secured together by bolts 58.

The oil under pressure is forced through the conduit 57 into the interior 59 of a control valve assembly 60. A valve member 62 is mounted for rotation therein, and is provided with an extending operating handle 63 for controlling the angular rotation of the member 62 within the housing 60.

The shaft 46 is provided with a plurality of hydraulic clutch members indicated generally at 64, which have the driving elements thereof keyed to the shaft 46 for conjoint rotation therewith. The driving portions of the clutches 64 are provided with annular inlet ports 65, 66 and 67 adapted to receive oil under pressure from the control conduits 68, 69 and 70 connected to the control valve 60.

The driven members 72, 73 and 74, respectively, of the clutch units 64, are mounted for rotation on suitable bearings 75, 76 and 77, carried on the shaft 46, whereby the driven members are free to rotate with respect to the shaft. The driven member 72 is provided with an axially extending sleeve portion carrying a radially extending gear member having teeth 78 at the outer periphery thereof, the teeth 78 engaging with the cooperating teeth of a gear element 79 which may be formed as a integral part of the countershaft 80' which is supported at its ends in the housing 40. The countershaft 80' has one end piloted in the bearing 82' disposed within a portion of the enlarged wall 50, while the opposite end of the shaft 80' is provided with a reduced portion 83' rotatably supported in bearings 84' mounted in the outer end of the housing 40.

The driven element 73 of the second hydraulic clutch 64 is provided with an annularly flanged portion 85' carrying gear teeth adapted to mesh with the teeth 86' of the gear portion 87' carried by the countershaft 80'. It will be noted that the driving ratio between the driven element 72 and the shaft 80' is greater than the driving ratio between the driven element 73 and the shaft 80'. This provides, in effect, the corresponding first and second speeds of a change speed transmission assembly.

The third driven element 74 is provided with an integral extending shaft portion 88' supported in suitable bearings 89' and 90' and mounted in the housing 40 between the bearings 89' and 90'. The shaft 88' is provided with a gear 92', which gear is driven from the gear portion 93' of the shaft 80'. Suitable overrunning clutch means of any desired type may be disposed between the shaft 88' and the gear 92' to permit idling of shaft 80' during direct driving engagement. The extending end of the shaft 46 is piloted within the end face of the driven element 74. When the element 74 is coupled hydraulically to the shaft 46 the shaft portion 88' of the element forms, in effect, a continuation of the driving shaft, and provides a direct drive between the engine shaft 44 and the driving means which may be suitably secured to the end 94' of the shaft portion 88'.

It will thus be apparent that we have provided a three speed transmission in which the gears are maintained constantly in mesh and are selectively coupled to the driving shaft by means of the hydraulic clutch members 64. To obtain this selective coupling, the valve member 62 is provided with a passageway 95' extending therethrough and having an enlarged opening 96' at one end thereof, which is adapted to be selectively aligned with the inlets of the supply conduits 68, 69 and 70 to produce selective operation of the corresponding clutch elements. A suitable by-pass or relief conduit 97' is provided between the valve housing 60 and the lower portion 54 of the housing 40 so that when it is desired to place the transmission in neutral or non-driving position, the valve member 62 is rotated in a clockwise direction until all of the ports communicating with the conduits 68, 69 and 70 are closed, and the oil under pressure from the conduit 57 flows through the valve housing 60 into the by-pass 97' and is returned to the transmission housing.

Considering now in detail the three-speed hydraulic transmission shown in Figure 6, the driven shaft of a power unit is indicated at 80 and is provided with a flange 82 suitably secured by means of the bolts 83 to the end flange 84 of the enclosing rotatable casing indicated generally at 85 of the hydraulic coupling unit, which unit is supported at the end adjacent the engine unit by means of bearings 86, and at its opposite end is provided with a cylindrical recessed portion 87 adapted to have engagement with bearings 88, the casing 85 thereby being rotatably mounted to have conjoint rotation with the shaft 80 within the transmission housing and engine housing.

The front portion or end toward the power unit of the casing 85 is provided with a ring gear 90 having radially extending teeth adapted to be engaged by any suitable starting mechanism for initially starting the engine through the rotation of the shaft 80. The hydraulic coupling casing 85 is provided with three rigid driving portions, indicated at 92, 93 and 94, each of which comprises a plurality of radially extending ribs or vanes formed integral with the various portions of the casing, and having at their free edges ring portions 95 extending annularly in integral engagement with each of the ribs of the driving elements 92, 93 and 94.

The casing 85 is made up of a plurality of component parts having radially extending flanges which are bolted together as indicated at 96, whereby the driving elements 82, 93 and 94 rotate as a unit upon rotation of the shaft 80. One of the intermediate elements 97 is provided with an inwardly extending radially flanged portion 98 which separates two of the hydraulic clutches, while a second intermediate element 99 is also provided with a radially and angularly extending portion 100 separating the driving element 93 from the driving element 94. The end element 102 carries the ribs of the third driving element 94, and is mounted for rotation on the bearings 88.

Cooperating with each of the driving elements 92, 93 and 94 is a corresponding driven element comprising members 103, 104 and 105. Each of the members 103, 104 and 105 is provided with radially extending vanes or ribs 106, corresponding to the vanes of the driven elements, and having an annular semi-cylindrical ring member 107 disposed therein joining all of the ribs or vanes of each of these members and cooperating with the ring portion 95 of the driving element to provide a substantially closed annular ring between the respective sets of ribs. The member 103 is provided with a hub portion 108 which is splined or otherwise non-rotatably secured to the splined end 109 of the shaft 89. A suitable stop nut 110 is threaded onto the reduced portion of the shaft 89 into engagement with the end face of the hub section 108 to prevent outward displacement of the member 103 with respect to the shaft 89. The extending reduced portion 112 of the shaft 89 is piloted in the bearings 111 carried by plate 84, whereby it is mounted concentrically with the drive shaft 80.

The member 104 is provided with a hub portion 113, splined at 114 to a tubular sleeve member 115 loosely rotatable on the shaft 89. The member 113 is also provided with a cylindrical flange portion 116 whereby it is rotatably supported with respect to the shaft 89 by means of the bearings 117 engaging the shaft between the sleeve 115 and the hub portion 108 of the member 103. A suitable lock nut 118 engages the end face of the hub portion 113 of the member 104 to prevent its displacement from the splined section of the tubular sleeve member 115.

The member 105 is provided with a hub portion 120 which is splined or otherwise non-rotatably secured to a sleeve member 122 freely rotatable upon the sleeve member 115. The member 105 is mounted for rotation with respect to the exterior surface of the sleeve member 115 by means of the roller bearings 123 carried between the extending cylindrical flange 124 formed integral with the hub portion of the member 105 and the outer surface of the sleeve 115 intermediate the hub portions 113 and 120. A suitable lock nut 125 is threaded onto the end of the sleeve member 122 to prevent displacement of the hub portion 120 of the member 104 outwardly thereof.

It will be noted that the remote side of the hydraulic clutch casing 85 is supported on the bearings 88 which, about their inner bearing race, are supported upon the external surface of a cylindrical flange member 126 shown in more detail in Figures 8 and 10. The member 126 is provided with a radially extending flange 127 whereby the same may be bolted to a gear case housing 128 which houses the change speed gears employed in connection with the present transmission. The bolts for securing the member 126 to the housing and in position about the external periphery of the sleeve 122 are indicated at 129, and also serve to secure a retaining ring 130 in position for supporting the outer race of a ball bearing member 132 interposed between the external surface of the tubular sleeve 122 and the retaining ring 130.

The end of the sleeve member 122 is provided with a radially extending portion 133 forming a ring gear having teeth 134, which teeth are adapted to mesh with the teeth 135 of a ring gear member 136 keyed or otherwise suitably secured to a countershaft 137 supported in suitable bearings 138 within the gear case housings 128. The opposite end of the shaft 137 is piloted in suitable bearings 139 carried in the retaining ring 140 which is piloted in the end of the housing 128, the ends of the countershaft 137 being provided with lock nuts 142 threaded thereon, the end of the shaft supported by the bearings 139 being suitably closed by means of the closure plate 143.

Suitable ball-bearing means 144 is interposed between the gear portion 133 of the tubular sleeve 122 and the external periphery of the sleeve 115, whereby the two sleeves are mounted for relative rotation with respect to each other. The sleeve 115 is provided with a radially extending portion 145, having the radially extending gear teeth 146 formed thereon, and supported on suitable double ball-bearing means 147 for free rotation about the shaft 89.

The teeth of the gear portion 145 of the sleeve 115 are adapted to have engagement with the teeth 148 of a gear member 149 which is mounted for free rotation about the countershaft 137 by means of the bearings 150 and 152.

The shaft 89, extending through the hydraulic clutch unit and through the gear housing 128, is piloted at its opposite end in the double ball-bearing means 153, being provided with a suitable lock nut 154, the bearings 153 being retained in position by the ring 155 piloted in the end of the housing 128, the end of the shaft being enclosed by the cover plate member 156. The shaft 89 is also provided with an intermediate splined portion 157 which is engaged by the splined hub 158 of a gear member 159 having rotation between the bearings 153 and a double set of bearings 160 and 162 which rotatably support a gear member 163, having gear teeth 164, for free rotation about the shaft 89. The teeth 164 of the gear member 163 are adapted to mesh with the teeth 165 of a gear member 166 which is splined at 167 to the countershaft 137, whereby rotation of the countershaft produced corresponding rotation of the gear 163.

The teeth of the gear 159 are adapted to have driving engagement with the teeth of a gear member 168 splined at 169 to the tubular shaft portion 170 of a bevel gear member 172, the shaft portion 170 of the gear member 172 being suitably supported in bearings 173 and 174 carried by the housing 175 which is bolted or otherwise secured to the upper surface of the housing 128, as indicated at 176. This housing 175 may be termed an adapter housing, since it is within the scope of the present invention to provide for any desired driving ratio by changing the gears 159 and 168, whereby the transmission may be employed to produce various driving ratios between engine shaft 80 and the bevel gear 172 independently of the individual gear ratios of the various speeds of the transmission. The bearings 173 are held in position by a pair of concentric retaining rings 177 and 178 threaded into a cylindrical boss portion 179 of the housing 175, the boss portion being provided with a closure plate 180 having a lug member 182 for preventing relative rotation between the retaining rings 177 and 178 and the boss portion 179. A suitable set screw 183 is provided for retaining the outer race of the bearing 174 in position.

As has been pointed out, the gear member 149 is freely rotatable with respect to the countershaft 137. In order to provide for effective rotation of the countershaft 137 upon predetermined rotation of the gear 149, we provide an overrunning clutch mechanism, shown more in detail in Figure 9, comprising a ring element 185 which is bolted to the side face of the gear 149 by means of a plurality of bolts 186 which may be suitably secured together to prevent relative rotation. The ring member 185 is provided with spaced offset inwardly extending portions 187 containing suitable spring-pressed ball means 188 having riding frictional engagement on the slightly tapered surface 189 of a clutching member 190. The clutching member 190 is provided, at its inner portion, with a radially extending flange having axially projecting teeth 191 formed in the side face thereof, the teeth 191 being of ratchet formation to engage with suitable ratchet teeth 192 formed in the side face of the gear 149 radially inwardly of the ring 185 and directly outwardly of the bearing 152. The ratchet tooth engagement is shown in detail in Figure 11, from which it will be apparent that the clutch is free to rotate in one direction with respect to the gear 149, but rotation in the opposite direction results in corresponding rotation of the gear member. The operation of this clutch will be described in detail hereinafter.

The portion 189 of the clutch member 190 is provided on its inner surface with helical splines 193 which are adapted to engage the helical splines 194 of the shaft 137.

A similar overrunning clutch arrangement is provided for clutching the gear 163 to the shaft 89. Thus we provide the gear 163 with axially extending ratchet teeth 195 which are engaged by the teeth 196 of a clutch member 197, which clutch member is mounted in splined relation as indicated at 198 on the shaft 89. The gear 163 carries a ring 199 bolted or otherwise suitably secured thereto, having the inwardly extending boss portions 200 carrying suitable ball members 202 for engaging the tapered surface 203 of the flanged portion of the clutch member 197. Thus the gear 163 can be directly clutched to the shaft 89 through the overrunning clutch mechanism described.

These overrunning clutches operate in a corresponding manner and a description of the operation of one clutch is therefore believed sufficient. The spring-pressed balls 188 have frictional engagement with the external surface of the hub portion of clutch member 190. When gear 149 is rotating at a faster rate than shaft 137, these balls act as fingers tending to drag the clutch member along in conjoint rotation therewith. This results in threading of clutch member 190 along splines 194 to move the member 190 axially of shaft 137 to clutch the shaft with the gear 149. As long as gear 149 is in driving engagement the clutch will remain engaged, this engagement being assisted slightly by the tapered surface 189 of the hub of the clutch member, whereby a slight lateral component of the spring pressure of the balls 188 is exerted toward clutching engagement.

When the drive ratio is shifted so that shaft 137 begins to rotate faster than gear 149, the ball members 188 again act as frictional fingers, tending to slow down the rotation of clutch member 190. Due to the slanting rear faces of the ratchet teeth, member 190 is initially moved outwardly to some extent, and the frictional drag results in further outward axial movement along splines 194, resulting in complete disengagement of the member 190 from the gear 149. The operation of clutch member 197 is similar.

Referring now in detail to the member 126, as shown in Figure 8, the flange 127 is secured to the housing 128 by means of a plurality of circumferentially spaced bolts 129. The flange is provided with a cylindrical extending portion 205 which is provided at oppositely spaced portions with a plurality of axially extending openings 206 and 207. These openings are drilled from the extending end face of the cylindrical flange 205 to a point adjacent the radial flange 127. Suitable parallel laterally extending passageways 208 and 209 are provided leading to the outer surface of the shoulder portion 210 of the member 126.

These openings extend into the enlarged passageways 212 and 213, shown in Figure 8, which project in opposite directions laterally to the outer portion of the housing 128, and there communicate with forwardly extending rectangularly shaped passageways 214 and 215 leading to suitable cylindrical outlet openings or ports disposed laterally on opposite sides of the housing 128. Connected to the cylindrical ports defining the ends of the passageways 214 and 215 are supply conduits 216 and 217, respectively, which are bolted or otherwise suitably secured to the housing 128 as indicated at 218.

It will therefore be apparent that liquid passing through the conduit 216 will pass through the passageway 214 and the passageway 212 into the ports 208, and thence will pass axially of the member 126 along the passageways 206, being discharged axially outwardly of the passageways 206 at the end of the cylindrical portion 205 thereof. Similarly, liquid passing through the conduit 217 and the passageways 215 and 213 will enter the passageways 207 through the ports 209, and will pass axially therethrough to the outwardly extending openings 219 formed intermediate the ends thereof. The opposite ends of the passageway 207 are closed by closure plugs 220 which are retained in position by the split clamping ring 222 engaging in suitable slots formed in the lateral surface of the plugs 220. While the liquid must be under a slight pressure to insure its passage through these passageways, the operation of the transmission unit is in nowise to be considered as a pressure operated system, since its operation is entirely controlled by centrifugal force, as will be described hereinafter.

Referring now to the transmission of drive from the selective speed transmission to the driving truck, the housing 175 is piloted in the side 225 of a gear housing box 226. A vertically extending shaft 227 is disposed in the gear box 226 and is provided with a central splined portion 228 adapted to have driving engagement with the collar or sleeve member 229 slidable axially thereon. The member 229 is provided at its opposite ends with outwardly extending gear teeth 230 and 232, which are adapted to have respective clutching engagement with internal gear teeth 233 and 234, respectively, of a pair of bevel gear members 235 and 236, which are normally continuously rotated in opposite directions by means of the bevel gear 172.

The bevel gear 235 is provided with an upwardly extending hollow tubular shaft portion 237, and is supported upon suitable roller bearings 238 carried between the outer surface of the shaft 237 and a central annular flange 239 of a closure plate 240 carried on the upper end of the housing 226.

The shaft portion 237 is also provided with suitable bearing support at 242 adjacent its upper end, whereby the sleeve or shaft portion 237 of the bevel gear 235 is maintained in free rotating position with respect to the shaft 227. The upper end of the shaft 227 is provided with a bearing 243 carried in a suitable closure cap 244 secured to the upper end of the closure plate 240, providing a thrust bearing for the upper end of the shaft 227.

The bevel gear 236 is provided with a tubularly extending shaft portion 245, which is mounted for rotation about the shaft 227 by means of the roller bearings 246 carried between the outer surface of the shaft 245 and the lower portion of the housing 226. The shaft portion 245 also has bearing support at 247 for mounting the bevel gear 236 for free rotation with respect to the shaft 227. The lower end of the shaft 227 is provided with a bearing guide 248, carried within a lower closure cap member 249 threaded onto the lower portion of the housing 226, whereby the shaft itself is guided within the tubular portions 237 and 245 of the bevel gears 235 and 236, and within the bearings 243 and 248, tending to maintain the shaft in proper alignment. Suitable sealing means 249' is provided at the lower end of the shaft to prevent leakage of oil outwardly of the gear housing.

The sleeve member 229 is provided intermediate its ends with an annularly extending flange 250, which is adapted to receive the upper race 252 of a ball bearing member, the lower race 253 thereof being held in position by the clamping ring 254 engaging in a suitable groove formed in the sleeve 229. The sleeve is reciprocated into engagement with the teeth 233 or the teeth 234 by means of a lever member 255, pivoted about a shaft 256 supported in the housing 226 and extending outwardly at one side thereof for attachment to any suitable operating means. The shaft 256, within the housing, is engaged by the split clamp indicated generally at 257, of an operating fork 258 having oppositely disposed yoke means 259 engaging the upper and lower races 252 and 253 of the ball bearing means carried by the sleeve 229, whereby movement of the lever 255 serves to rotate the shaft 256, thereby rocking the forked lever 258 in opposite directions to provide for selective engagement of the sleeve 229 with either of the vertically disposed bevel gears 235 or 236. A suitable closure plate 260, having a piloting shoulder 262 engaging in the outer face of the gear housing 226, closes the outer portion of the same, and may be secured to the housing in any desired manner.

The lower end of the shaft 227 is provided with a tapered portion 263, which is adapted to receive the flexible coupling member 264 shown in Figures 3 and 4. From the flexible coupling 264 a suitable telescoping shaft drive is provided, which is rotated by means of rotation of the shaft 227 and extends through a suitable opening in the floor 29 of the car body to a suitable flexible coupling member 265 disposed at the lower ends of the shaft members and immediately above the bevel gear housings 266 carried by the trucks 15 and 16. The lower end of the shaft portion below the flexible coupling 265 extends angularly into the housing 266, and has secured thereon a bevel gear member 267, which is adapted to have driving engagement with a second bevel gear 268 carried by the torque shaft 39, the shaft 39 at its opposite end having a bevel gear 269 meshing with the ring gear 270 which is preferably pressed onto the axles 38 of the driving truck and is enclosed within the housing 271. The driving arrangement from the housing 266 to the axles is described in more detail in the above referred to Burrows and Williams application. Suitable flanged car wheels 272 are rigidly secured to opposite ends of each of the axles, and are adapted to have driving engagement with the tracks 17. These wheels may be of the type shown in the copending Burrows and Williams application, Serial No. 699,700, filed November 25, 1933, and may be provided with any suitable type of brake mechanism, which has not been shown herein for the sake of clarity.

Referring now in detail to Figure 7, which shows diagrammatically the control mechanism employed for securing simultaneous shifting of all of the power units at the same time, we provide a housing 275 which is adapted to contain the hydraulic clutch element and which may be formed integral with the housing 128 containing the change speed gearing. The housings 128 and 275, at their bottom surfaces, are provided with flanged openings 276 to which may be bolted the flanges 277 of coupling members 278 connected through the pipe 279 to a reservoir 280, the pipe 279 having a similar coupling 282 at its opposite end bolted to an inlet opening in the reservoir 280. Oil from the gear housings 128 and 275 is thereby drained through the opening 276 and the pipe 279 into the reservoir 280, and the reservoir is provided with a plurality of oil pumps indicated diagrammatically at 283, 303, 304 and 305.

The pump 283 is actuated by a suitable electric motor 285, which is connected by the conductor 286 to one power line 292, and by a conductor 288 to a contact segment 289 adapted to be engaged by the controller switch member 290 which is connected to the opposite conductor 287 of a power line. The conductors 287 and 292 may be connected to any suitable source of electric current, such as to the supplemental generating units operated by the power units 24.

The pump 283 preferably comprises a plurality of individual oil pumps of the gear type, three of which are indicated at 291, 292 and 293. Each of the pumps 291, 292 and 293 supplies oil to a corresponding nozzle 294, 295 and 296 through conduits 297, 298 and 299, respectively. These nozzles are directed at the points of meshing engagement between the respective gears in the gear housing 128, and the discharge of the nozzles may be varied to supply the proper amount of lubricating medium to each point of meshing engagement. Since all of the gears are constantly in mesh and rotate during operation of the system, it is essential that they be properly lubricated. For this purpose, instead of having the gears run in oil, we provide for spraying oil or other similar lubricating medium upon the points of meshing engagement of the gears. This oil then drains from the gears and is conducted back to the reservoir 280 through the pipe 279, as previously described.

The reservoir 280 is provided also with the three pump units 303, 304 and 305, which pump units have their outlets connected to the conduits 216, 217 and 306, respectively. The conduits 216 and 217 are adapted to communicate with opposite sides of the housing 128, and transmit oil from the pumps 303 and 304 into the passageways 214 and 215, respectively, for passage through the passageways 206 and 207, respectively.

Each of the pump units 303, 304 and 305 is operated by an electric motor, as indicated at 307, 308 and 309. One terminal of each of the motors is connected through the conductors 310, 312 and 313 to the power conductor 292, while the other terminal of each of the motors is connected through the conductors 314, 315 and 316, respectively, to three corresponding separated contacts 317, 318 and 319, adapted to be selectively engaged by the control switch arm 290.

The conduit 306 is adapted to supply oil through the coupling 320 to a conduit 322 extending through the interior of the housing 275 enclosing the hydraulic clutches, as shown in Figure 6, the conduit 322 being provided with one or more outlet ports 323 directed into the circumferentially spaced openings 324 of the driving element 92 of the first hydraulic clutch.

For first speed operation, oil is forced by the pump 307, when the controller switch 290 has engaged the segment 289 and the contact 317 to actuate the motors 285 and 307, through the conduit 216 into the member 126, from whence this oil passes through the axially extending passageways 206 into the annular chamber indicated at 325 in Figure 6. From this annular chamber, the oil is adapted to pass through the angularly extending ports or passageways 326, spaced circumferentially in the hub portion 120 of the element 105, into the annular passageway 327 disposed between the driving element 93 and the driven element 104 of the intermediate hydraulic clutch. This oil entering the spaces between the ribs of the driving element 93 is forced outwardly past the annular rib 95 by the centrifugal force caused by rotation of the element 93, and is projected outwardly of the ribs of element 93 adjacent the outer peripheral edge thereof. The oil thus discharged from each of the ports formed by these ribs impinges on the adjacent surfaces of the ribs 106 of the driven element 104, and due to the circumferential component of velocity imparted to this oil by the rotation of element 93, produces an effective force on the surfaces of ribs 106 causing a rotative force to be applied to the element 104 adjacent its periphery. This force, multiplied by the moment arm corresponding to the radius of the element, produces a corresponding torque tending to rotate the sleeve 115.

The oil discharged by rotation of the driving element 93 may thus be compared to an oil pressure developed by a centrifugal pump and discharged through nozzles against a hydraulic rotor or turbine member, namely, the driven element 104. The oil impinging on the surfaces of vanes 106 is forced inwardly by the pressure of the oil behind it past the annular rib 107 and then across the inner surface of vanes 106 into contact with the ribs of the driving element 93, thus providing for rotary movement of this oil about the annular ring formed by members 95 and 107. At the same time the oil has a translational movement imparted to it in a circumferential direction by the rotation of element 93 circumferentially, whereby the kinetic energy developed due to centrifugal force is imparted to the rotor 104 to produce rotation thereof. The member 104 therefore has a tendency to come up to conjoint rotation with the member 93, although never actually reaching this point due to the torque resistance thereon. Rotation of the member 104 results in corresponding rotation of the tubular sleeve 115, thereby producing rotation of the gear member 145, which drives the freely rotatable gear 149 in a counterclockwise direction.

Inasmuch as the member 149 is free to rotate on the shaft 137, no rotation of the shaft 137 occurs until the clutch member 190 rides up the helical splines 193 and 194, due to the relative differential rotation between the member 149 and the shaft whereby the clutch is screwed axially of the shaft into engagement to lock the ratchet teeth 191 and 192 together for conjoint rotation. This, in turn, produces rotation of the shaft 137 which drives the gear 166 to produce corresponding rotation of the freely rotatable gear 163.

In a similar manner, due to difference in speed of rotation of shaft 89 and gear 163, the clutch 197 then rides up the helical splines 198 on the shaft 89, until the gear 163 is clutched to the shaft 89, as previously described. This produces rotation of the shaft 89 to rotate the gear 159 which, in turn, rotates the gear 168 to cause rotation of the bevel driving gear 172. The rotation of the bevel gear 172 results in rotation of either of the gears 235 or 236, depending upon the position of the shift fork 258, and thereby produces driving rotation of the shaft 227. Thus first speed operation of the transmission is produced.

When it is desired to shift from first to second speeds, the operator or engineer merely moves the lever 290 from engagement with the contact 317 into engagement with the contact 318. This results in energizing the motor 308 to drive the pump 304, thereby producing flow of oil through conduit 217 into the port 215 of the housing 128. Oil then flows through the passageways 207 in the member 127, and is directed outwardly through the ports 219 into the annular space 328 between the members 94 and 105 of the right-hand hydraulic clutch member, as shown in Figure 6.

This oil is thrown outwardly by centrifugal force in the manner previously described and gradually fills the annular spaces about the ring provided by the semi-circular elements 95–107, causing a driving force to be transmitted to the member 105, whereby the member 105 rotates the tubular sleeve 122, causing rotation of the gear 133. This results in driving engagement of this gear with the gear 136, causing positive rotation of the shaft 137 to which the gear 136 is splined. Rotation of this shaft is at a faster rate than the shaft was rotating during the driving engagement produced by the clutch 190 due to rotation of gears 145 and 149, inasmuch as the gear ratio between the gears 133 and 136 is smaller than the ratio between the gears 145 and 149. This relative difference of rotation results in faster travel of balls 188 with respect to clutch element 190, producing declutching of the clutch element 190 from the gear 149, whereby the gear 149 idles about the shaft 137, and since no more oil from the pump is being forced into the intermediate hydraulic clutching elements, the sleeve 115 merely idles about the shaft 89. The shaft 137, directly driven under the influence of the driving engagement between the gear 136 and the gear 133, rotates the gear 166 to produce rotation of the bevel gear 172 in the same manner, but at a higher speed.

During this operation, oil from the intermediate hydraulic clutch member is being discharged through the peripheral ports 329 disposed outwardly of the vanes 93 and 106, this oil being displaced outwardly by reason of the centrifugal action produced by rotation of the casing 85. The area of the openings 329 with respect to the volume of oil supplied is such as to allow building up of oil during the time that oil is supplied to the clutching element to allow the clutching of the driving and driven elements together, but discharges all of the oil by centrifugal force from the hydraulic clutch when the motor for supplying the oil to this clutch is deenergized. Thus the space within the vanes 93 and 106 is gradually emptied of oil by the centrifugal discharge of the oil outwardly of the casing through the ports 329. The relative rate of discharge of oil from ports 329 with respect to the rate at which oil is supplied for coupling engagement allows filling of the clutch in a predetermined relatively short period of time.

In order to prevent flooding of the selected clutch and possible leakage into an adjacent unenergized hydraulic clutch due to too much oil being supplied to the first clutch, suitable overflow means is provided in the radially extending flange 98 comprising a plurality of enlarged boss portions 330 formed therein and provided with radially extending passageways 332 opening outwardly of the casing 85, the passageways 332 being provided with ports 333 whereby as the level of oil fills up in the hydraulic clutch member until it reaches the ports 333, no displacement of oil except through ports 329 will take place, but as the oil level reaches the ports 333 oil will be displaced outwardly through the passageways 332 to the external portion of the casing 85 at a rate sufficient to prevent flooding of the clutch.

In a similar manner, metered displacement of oil from the hydraulic clutch elements 94 and 105 is provided through the passageways 334, as shown in Figure 6, and suitable overflow means is provided in the depending wall portion 100 of the member 99 by means of the ports 335 and the radially extending passageways 336 formed therein.

Thus it will be apparent that the shift from first to second driving speeds of the selective change speed transmission can be accomplished simultaneously at all of the power units by the use of the hydraulic coupling element, the control being effected by movement of the switch handle 290 by the operator, whereby the energizing pumps for the lower speed are deenergized to provide for relatively slow declutching of the first speed hydraulic clutch members by continued discharge of the remaining portion of oil through ports 329, and the pump units for the second or intermediate speed are simultaneously energized to provide for clutching of the second clutch elements. Inasmuch as the torque load imposed upon the transmission is a direct function of the rate at which the elements will clutch, due to the fact that this torque is responsible for the resistance to the kinetic energy of the centrifugally discharged oil between the relatively stationary driven element and the rotating driving element as the oil is initially impinged against the rotor, it will be apparent that if one of the power units is taking more than its proportionate load of the car, it will not be clutched until such time as all of the units are taking their proportional load. This simultaneous self-compensating feature insures that each of the power units will take its proportionate part of the load during shifting of the speed of the mechanism.

In order to shift from second to third speeds, the operator shifts the control lever 290 into contact with the contact 319, thereby deenergizing the motor 308 and energizing the motor 309 for supplying oil to the nozzles 323. This results in building up of kinetic energy in the oil passed into the hydraulic clutch comprising the driving element 92 and the driven element 106, thereby producing direct rotation of the shaft by means of the engagement of the hub portion 108 of the element 106 with the shaft 89. This therefore produces a direct drive from the power unit to the shaft 89, resulting in rotation of gears 159 and 168 to rotate the bevel driving gear 172. The overflow means for the high speed hydraulic clutch comprises a plurality of bosses similar to the bosses 330, but spaced therebetween and having corresponding ports opening into the annular space 338 disposed between the member 106 and the flange 98. Metered discharge outlets 339 are provided for discharging a certain portion of oil from the hydraulic clutch during direct drive, as previously explained.

When the shaft 89 is directly driven by means of the driven element 106 coupled to the driving element 92, the relative rate of rotation of the shaft 89 is greater than the rate of rotation of the gear 163. Due to the frictional engagement of balls 202, the clutch member 197 is thereby backed away from clutching engagement with the teeth 195 and produces idling movement of the gear 163 about the bearings 160 and 162 of the shaft 89. This results in idling of the gear 166 keyed to the shaft 137, and therefore results in only idling movement of the sleeves 115 and 122.

Without the provision of this overrunning type of clutch, such as shown at 190 and 197, the gears would drive the first and second speed elements at a high rate of speed during direct drive, since the gears are constantly maintained in mesh. It is therefore necessary to provide for some declutching means to prevent this operation of the intermediate speed gears during high speed operation of the car.

It is obvious that all four of the driving units are simultaneously under the control of the operator, and the switch handle 290 can be used for controlling any desired number of driving units, since the conductors 310, 312, 313, 314, 315 and 316 may be provided with as many branch connections as desired, as shown in Figure 7, going to various other control motors for the opeartion of the other clutch elements of similar power units. Similarly, branch conductors as shown at 340 are led from the conductors 286 and 288 to other constantly operating motors 285 connected to other of the power units, since it is essential that the motor 285 be energized at all times that any one of the speed control motors is energized, in order to provide for sufficient oil in the reservoir 302. Thus the segment 289 is so formed as to have contact engagement with the member 290 at all times that the member 290 is in engagement with any one of the contacts 317, 318, or 319. Similar branch conductors 340 are connected to the conductors for the respective terminals of motors 307, 308 and 309.

By the provision of the hydraulic clutching element which may be selectively controlled to provide for various speed ratios to the transmission, it is obvious that the operator can shift from first to third speed, or from second to first to third speeds, or may shift his speeds in any desired sequence or manner, depending upon the conditions met in the propulsion of the vehicle, inasmuch as there is no necessity for going through a predetermined sequence of shifting operations, such as is common in the usual type of change speed transmissions.

If desired, only two power units may be employed, one at each end of the car over the driving trucks 16 and 17, and in such case the vertically extending drive shaft 37 will be coupled to a driving gear box for transmitting the drive equally in both directions to the axles 38 of one of the trucks, as described in detail in the copending Burrows and Williams application, Serial No. 630,961, filed August 29, 1932.

It will be noted that the drive from the bevel gear box 36, as shown in Figures 3 and 4, to the truck bevel gear set 266, is provided through angularly extending shaft sections disposed on opposite sides of the king pin. The reason for the angular position of these shaft sections is that the drive should be transmitted to the trucks at as close a point as possible to the king pin or pivot of the truck. For this reason, the engine units 23, which are spaced apart a considerable distance in order to provide for access to each of them individually, must be provided with some means whereby the drive can be transmitted angularly to the driving trucks. By the provision of the construction disclosed, we are enabled to retain this feature even when more than one driving unit is employed. The mechanism for operating the reversing lever 255 can be of any desired or well-known type. For instance, it has been the practice in the railroad art to provide pneumatic means for shifting this lever in opposite directions to effect forward or reverse drive at the driving truck. Such a control mechanism can be readily incorporated with the lever 255 to accomplish this purpose, if so desired, and in such case the control mechanism for operating the compressed air or pneumatic mechanism will be disposed adjacent the control switch 290 so that the operator or engineer may have the control instrument disposed at the proper point for simultaneous operation of all of the mechanism.

We have provided for the direct incorporation of a bearing and gear oiling system for the hydraulic transmission and gear casing. Inasmuch as the gears do not run in oil, it is necessary to provide some means for lubricating the various bearings in the assembly to prevent unnecessary wear and noise.

Thus we provide a suitable port 341 in the cover plate 143 of the housing 138 which is provided with an inwardly extending portion 342 piloted within an enlarged recessed opening 343 of the shaft 147. Oil is introduced through the port 341 from an oil pump unit 344 driven by the motor 285 and supplied through the conduit 346 into the recess 343 and this oil travels axially of the shaft through the passageway 347 extending therethrough. Between the bearings 150 and 152 we provide for a series of radially extending passageways 348 whereby a portion of this oil is transmitted outwardly to the external surface of the shaft by centrifugal force, and is passed through suitable ports in the bearing separator member 349 to effect lubrication of the bearings 150 and 152. This also provides for distribution of lubricating oil over the splines 194.

Adjacent the opposite end of the passageway 347 there is provided another series of radially extending ports 350 providing for lubrication of the bearing 138 through the diagonal passageways 352 in the gear member 136. The pilot bearings 139 at the outer end of the shaft 137 are lubricated by the passage of oil outwardly of the shaft along the walls of the recess 343 into the annular space between the cover plate 143 and these bearings.

In a similar manner we provide a port 353 in the cover plate 156 of the housing 128 having communication with the recessed end 354 of the shaft 89. The shaft 89 is provided with a substantially axially extending passageway 355 communicating with the recessed opening 354, this passageway receiving oil introduced into the port 353. The passageway 355 is provided with a first series of radially extending ports 356 which communicate with suitable openings 357 in the hub portion of the gear 159 for effecting lubrication of the bearings 160 and 162. A second series of radially extending passageways 358 are provided adjacent the splined portion 198 of the shaft for effecting lubrication of the ball bearings 147.

Additional series of radially extending passageways 359 and 360 are provided for lubricating the bearings 144 and 132, respectively, through suitable aligned openings in the sleeves 115 and 122.

At its remote end the passageway 355 is provided with an eccentrically extending passageway 362 communicating therewith, and extending inwardly to the piloted end 112 of the shaft 89. The passageway 362 provides for transmission of oil from the passageway 355 to the pilot bearings 111.

Lubrication of the bearings 117, 123, and 88 is effected by the oil employed for energization of the various clutch units so that, by reason of the present system, all of the bearings of both the hydraulic clutch assembly and the gear assembly are assured proper lubrication for reducing the noise of operation and prolonging the life of the bearings.

In order to effect lubrication of the bearings 173 for the beveled gear shaft 170, we provide a suitable inlet port 364 formed in the cover plate 180 of the adaptor housing 175, which port communicates with an internal axially extending passageway 365 formed in the projecting cylindrical column 366 extending centrally of the beveled gear shaft. The passageway 365 has suitable radially extending ports 367 adjacent the outer end thereof which communicate through the shaft 170 and the bearing retaining nut 178 with the bearings 173 and supply lubrication oil thereto. A second series of radial passageways 368 are provided for supplying oil through the hub portion of the gear 168 to the bearings 174, the gear 168 having diagonal passageways therein directed toward the bearings 174.

Due to the relatively high speed of rotation of the beveled gear 172 within the relatively small gear chamber formed by the housing 226, a blower action is set up within this chamber between the gears 170, 235 and 236 which prevents the proper lubrication of these gears by means of oil spray nozzles. However, inasmuch as these gears need be lubricated only at the points of meshing engagement, we have devised a pressure feed lubrication for supplying lubricant to the base portions of the teeth 172 of the gear 170 whereby this lubricant is moved outwardly along the face of these gear teeth by centrifugal force to provide for lubricating the points of meshing engagement. The cylindrical column 366 is therefore provided with two opposed fan-shaped passageways 370 and 372 which communicate with the internal surface of the beveled gear shaft 170 throughout a predetermined angle anterior to the points of meshing engagement. The gear 170 is provided with a plurality of ports 373 extending substantially normal to the beveled surface at the root diameter of the teeth and aligned with the openings 370 and 372. These ports supply oil to the base of each of the gear teeth as the respective gear teeth approach the point of meshing engagement, and the arcuate extent of the passageways 370 and 372 is proportioned to insure that oil will be delivered to the surfaces of the teeth whether the gear is rotating at slow or high speed.

Thus when the gear is rotating at slow speed, the oil which enters the passageway 373 at the remote portion of the ports 370 and 372 will be carried over the point of meshing engagement before the centrifugal force forces it to leave the gear, while in the high speed rotation the oil supplied from the initial portion of the ports 370 and 372 to the gear teeth will be carried over past the point of meshing engagement. This insures proper lubrication at all speeds.

The port 353 communicating with the passageway 355 of the main shaft 89 is supplied with oil from the unit 375 of the oil pump 283 through the conduit 376 communicating therewith. The oil for the port 364 is supplied by the unit 377 of the gear pump 283 through the conduit 378. Inasmuch as the motor 285 is constantly energized whenever the rail car is in operation, it is apparent that lubricant will be forced to the nozzles 294, 295 and 296 and to the lubricating ports 341, 343, and 364 during all speeds of operation of the transmission, the pump 283 being a multiple gear type pump having a plurality of gears which may be arranged in a single gear train to have their outlet ports connected to the respective conduits, while all of the inlet portions thereof may be connected to the reservoir 280. The sleeves 115 and 122 are lubricated by leakage of oil along the surface of shaft 89 and from the adjacent bearings and clutch elements.

It is obvious that the details of construction of various of the arrangements and modifications shown herein may be varied to a considerable extent, without, however, departing from the underlying principles forming the basis of the present invention. We therefore do not intend to be limited to the particular structure which we have shown and described, except insofar as defined by the scope and spirit of the appended claims.

We claim:

1. In a car of the class described, a car body, a pair of trucks beneath said body for supporting said body for movement, each of said trucks comprising a pair of parallel spaced driving axles, wheels at the opposite ends of each of said axles, a pair of laterally spaced independent gear sets carried by each of said trucks between said axles, angularly and upwardly extending drive means connected to each of said sets and projecting into the car body in laterally spaced relation, drive transmitting means extending horizontally from each of said gear sets to a corresponding axle, power units spaced in pairs longitudinally within said car body, and hydraulic transmission means between each of said units and the projecting end of each one of said drive transmitting means.

2. In a rail car of the class described, a car body, a pair of trucks spaced longitudinally beneath said car body and including driving axles having wheels thereon for propelling said car along a track, a bevel gear set at each of said axles having a horizontally extending drive shaft extending to the transverse center of the truck in laterally offset relation, vertically extending drive means for each of said drive shafts, and laterally spaced power units supported in said car body over each of said trucks and connected to said drive means, there being one power unit for each driving axle.

3. A rail car comprising a car body, an engine compartment spaced forwardly in said body, an engine compartment at the rear end of said car body, a pair of driving trucks for supporting said car body and each mounted beneath one of said engine compartments, a plurality of driving axles on each of said trucks, laterally spaced horizontal drive means extending from each of said axles toward the center of said truck, a corresponding plurality of engine units in said engine compartments, variable ratio drive transmitting means between each of said units and an associated drive means for independently connecting one engine unit to each of the respective driving axles, and common electrical control means in the operator's compartment for effecting simultaneous change of driving ratio between each of said units and the axle driven thereby.

4. A rail car comprising a car body, engine compartments spaced longitudinally of said car body, a driving truck for supporting and propelling said car along a track mounted beneath each of said engine compartments, a plurality of driving axles on each of said trucks, independent laterally spaced mechanical drive transmitting means extending from each axle to the center of said truck, and thence upwardly into the corresponding engine compartment and a corresponding plurality of engine units in laterally spaced position in each of said compartments each hydraulically connected to one of said drive transmitting means.

5. A rail car including a car body, driving trucks adjacent opposite ends of said car body, a plurality of driving axles on each of said trucks, a corresponding plurality of engine units in said body disposed in laterally spaced position over said trucks, each of said units having downwardly and inwardly extending drive transmitting means, horizontal drive means in said truck connected at one end to said drive transmitting means and mechanically coupled at the opposite end to one of said axles, change speed gearing between each of said units and said corresponding drive transmitting means, means for simultaneously coupling any selected speed gearing between said units and said drive transmitting means, and means at the upper end of said drive transmitting means for producing driving of said axles in either direction through any one of said selected speed gearing.

6. In a rail train construction, a power car having driving trucks pivotally mounted therebelow adjacent opposite ends thereof, a plurality of axles on each of said trucks, drive means extending horizontally from each of said axles toward the center of each of said trucks and terminating in lateral spaced bevel gear sets having vertical outwardly diverging stub shafts, a plurality of power units in said car disposed in laterally spaced position over each of said trucks, drive transmitting means extending downwardly from said units toward said stub shafts, and driving means between said drive transmitting means and said stub shafts accommodating relative angular and vertical movement between said trucks and said car.

7. In a rail train construction, a power car having driving trucks pivotally mounted therebelow adjacent opposite ends thereof, a plurality of axles on each of said trucks, laterally offset drive means extending horizontally from each of said axles toward the center of each of said trucks and terminating in bevel gear sets having vertical outwardly diverging stub shafts, a plurality of power units in said car disposed in laterally spaced position over each of said trucks, drive transmitting means extending downwardly from each of said units toward the corresponding stub shaft, and driving means between said drive transmitting means and said stub shafts accommodating relative angular and vertical movement between said trucks and said car, said driving means comprising universal couplings engaging said transmitting means and said stub shaft, and intermediate splined telescoping shaft means.

8. In a rail vehicle, a vehicle body having engine compartments at opposite ends, a pair of engine units disposed side by side in each compartment, a driving truck under each compartment supporting said body and having drive axles at opposite ends of the truck, independent drive shafts extending horizontally from each axle to the center of said truck and disposed in laterally offset relation on opposite sides of the longitudinal center of the truck, vertical drive transmitting means extending in laterally diverging relation from the end of each drive shaft upwardly through the body into position adjacent the ends of the corresponding engine units, constantly meshed change speed transmissions on each unit connected to the upper end of the corresponding drive transmitting means, hydraulic coupling means between said units and said transmissions, and means for simultaneously coupling all the engine units through said transmissions to the respective axles in the same driving ratio.

9. In a rail vehicle, a vehicle body having engine compartments at opposite ends, a pair of engine units disposed side by side in each compartment, a driving truck under each compartment supporting said body and having drive axles at opposite ends of the truck, independent drive shafts extending horizontally from each axle to the center of said truck and disposed in laterally offset relation on opposite sides of the longitudinal center of the truck, vertical drive transmitting means extending in laterally diverging relation from the end of each drive shaft upwardly through the body into position adjacent the ends of the corresponding engine units, constantly meshed change speed transmissions on each unit connected to the upper end of the corresponding drive transmitting means, hydraulic means at each unit for selectively coupling each of said units through said transmissions to said axles, and means operable from a remote point for simultaneously actuating said hydraulic means at all said units to effect drive from said units to said axles through a preselected drive ratio.

10. In a rail vehicle, a vehicle body having longitudinally spaced compartments, a pair of laterally spaced engine units in each compartment having drive shafts extending outwardly of the same ends thereof, a truck beneath each compartment having a pair of drive axles, drive shafts extending horizontally from each axle to the center of said truck and disposed in laterally offset relation, upwardly projecting drive transmitting means extending from the axle drive shafts into said engine compartments adjacent the ends of said engine drive shafts and disposed in the same transverse vertical plane, and transmission means between said engine drive shafts and the upper end of said drive transmitting means, each including a plurality of constantly meshed change speed gear sets and individual hydraulic coupling units for selectively connecting each gear set to the corresponding engine drive shaft, and a common actuating member for simultaneously selecting and actuating the corresponding coupling unit in each transmission whereby each engine unit drives its respective axle through corresponding gear sets.

ROBERT J. BURROWS.
ALFRED O. WILLIAMS.
ROBERT LAPSLEY.